United States Patent [19]

Kotoda

[11] Patent Number: 5,021,899
[45] Date of Patent: Jun. 4, 1991

[54] TAPE LOADING APPARATUS FOR CASSETTE TAPE PLAYER

[75] Inventor: Yoshihiro Kotoda, Kanagawa, Japan

[73] Assignee: Kabushiki Kaisha Toshiba, Kanagawa, Japan

[21] Appl. No.: 394,740

[22] Filed: Aug. 16, 1989

[30] Foreign Application Priority Data

Aug. 26, 1988 [JP] Japan .................. 63-212053

[51] Int. Cl.⁵ ............................................. G11B 15/665
[52] U.S. Cl. ............................................ 360/85; 360/95
[58] Field of Search .............................. 360/84, 85, 95

[56] References Cited

U.S. PATENT DOCUMENTS

| | | | |
|---|---|---|---|
| 4,138,699 | 2/1979 | Ura et al. | 360/85 |
| 4,323,936 | 4/1982 | Beitler et al. | 360/85 |
| 4,556,922 | 12/1985 | Erhart | 360/85 |
| 4,930,028 | 5/1990 | Kunimara et al. | 360/85 |
| 4,964,002 | 10/1990 | Nakamichi | 360/95 |

FOREIGN PATENT DOCUMENTS

| | | |
|---|---|---|
| 74148 | 3/1983 | European Pat. Off. |
| 162497 | 11/1985 | European Pat. Off. |
| 227954 | 7/1987 | European Pat. Off. |
| 228571 | 7/1987 | European Pat. Off. |
| 2281623 | 3/1976 | France . |
| 2477748 | 9/1981 | France . |
| 56-47623 | 11/1981 | Japan . |
| 57-23334 | 5/1982 | Japan . |
| 2014778 | 8/1979 | United Kingdom . |
| 2020878 | 11/1979 | United Kingdom . |
| 2194666 | 3/1988 | United Kingdom . |

Primary Examiner—David J. Severin
Attorney, Agent, or Firm—Finnegan, Henderson, Farabow, Garrett, and Dunner

[57] ABSTRACT

A cassette tape player provided with a rotary head drum including a magnetic head to reproduce or record data from/to a tape including a tape loading mechanism for loading the tape onto the drum, a tape pulling slider operated by the tape loading mechanism for holding the tape against the drum during reproducing or recording operation a link mechanism for moving the tape pulling slider into reproducing or recording position and providing a first force to hold the tape pulling slider there during the reproducing or recording operation and a spring operative to apply a second force to the tape pulling slider to retain the slider in the reproducing or recording position during the reproducing or recording operation.

5 Claims, 2 Drawing Sheets

TAPE LOADING APPARATUS FOR CASSETTE TAPE PLAYER

FIELD OF THE INVENTION

The present invention relates generally to a cassette tape player, and more particularly, to a tape loading apparatus for a cassette tape player.

BACKGROUND OF THE INVENTION

Tape players which are used for recording and reproducing audio signals or both audio and video signals have been widely used These tape players generally are adapted for use with audio cassette tapes or video cassette tapes. Recently, there has been developed a digital audio tape player (hereinafter called DAT players). The DAT players are capable of recording and/or reproducing digital signals to or from digital audio tape cassettes (hereinafter called DAT cassettes).

The DAT cassette is about a half the size of a conventional audio cassette tape. A tape housing of the DAT cassette is provided with a pivotal cover and a slide cover. The pivotal cover rockably covers a tape housed in the tape housing. The slide cover covers reel hubs of a take-up reel and a supply reel which are rotatably housed in the tape housing. The DAT cassette is thus designed to have a closed construction to prevent the intrusion of dust. The dust may injure the tape or cause a data drop-out during recording and/or reproducing operations.

The DAT player generally comprises a cassette loading mechanism and a tape loading mechanism. When the DAT cassette is applied to the DAT player, the cassette loading mechanism carries the DAT cassette into a prescribed operating position. The cassette loading mechanism also works on the pivotal cover and the slide cover during the loading operation. Thus, the pivotal cover turns to expose the tape and the slide cover slides to expose the reel hubs. The tape is then pulled out from the tape housing by the tape loading mechanism. The tape loading mechanism then loads the tape on a rotary head drum in the DAT player. When the tape loading operation is completed, the tape is wound on the rotary head drum for a prescribed periphery.

The tape loading mechanism comprises many elements, such as a tape pulling slider, a tape guide roller and a tape guide pin. In order to hold the tape stably in the loaded state, it is necessary to secure the tape loading mechanism, in particular, the tape pulling slider, in its position when the tape loading has been completed. The position of the tape loading is defined by a prescribed positioning device or a catcher.

Generally, a moment of force relating tO the operation of the tape pulling slider is used for holding the tape stably in the loaded state. The moment of force appears when the tape pulling slider is pressed against the catcher by a drive mechanism for driving the the tape pulling slider, e.g., a rotating link connected to the tape pulling slider. The accuracy of the tape loading completion state has been increased by making the moment of force large.

The moment of force often depends on the size of the tape loading mechanism. Recently, tape players including DAT players have been required to be compact in size. When the tape players are made compact in size, the size of the tape loading mechanism, e.g., the size of the rotating link, is reduced. This causes the moment of force applied to the tape pulling slider to be small so that the tape loading mechanism cannot hold the tape stably.

SUMMARY OF THE INVENTION

It is, therefore, an object of the present invention to provide a tape loading apparatus for a cassette tape player which is able to hold a tape in a stable tape loading state.

In order to achieve the above object, a tape loading apparatus for a cassette tape player according to one aspect of the present invention includes a magnetic head to reproduce or record data from/to a tape including a tape loading mechanism for loading the tape onto the drum, a tape pulling slider operated by the tape loading mechanism for holding the tape against the drum during reproducing or recording operation, a link mechanism for moving the tape pulling slider means into the reproducing or recording position and providing a first force to hold the tape pulling slider there during the reproducing or recording operation and a spring operative to apply a second force to the tape pulling slider to retain the slider in the read/write position during read or write operation.

In order to achieve the above object, a tape loading apparatus for a cassette tape player according to one aspect of the present invention includes a rotary head drum equipped with a magnetic head for recording or reproducing data to/from a tape, a tape pulling slider equipped with a tape guide mechanism which pulls out and guides, a tape from a tape cassette, a tape pulling slider driving mechanism which drives the tape pulling slider along the guide groove provided on the chassis, a catcher which catches the tape pulling slider driven by the tape pulling slider driving mechanism and performs the positioning of a tape pull-out completing position, and a tape pulling slider bias mechanism which biases the tape pulling slider to move in the tape height direction by applying a driving force and brings the tape pulling slider in contact with the catcher under pressure.

Additional objects and advantages of the present invention will be apparent to persons skilled in the art from a study of the following description and the accompanying drawings, Which are hereby incorporated in and constitute a part of this specification

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
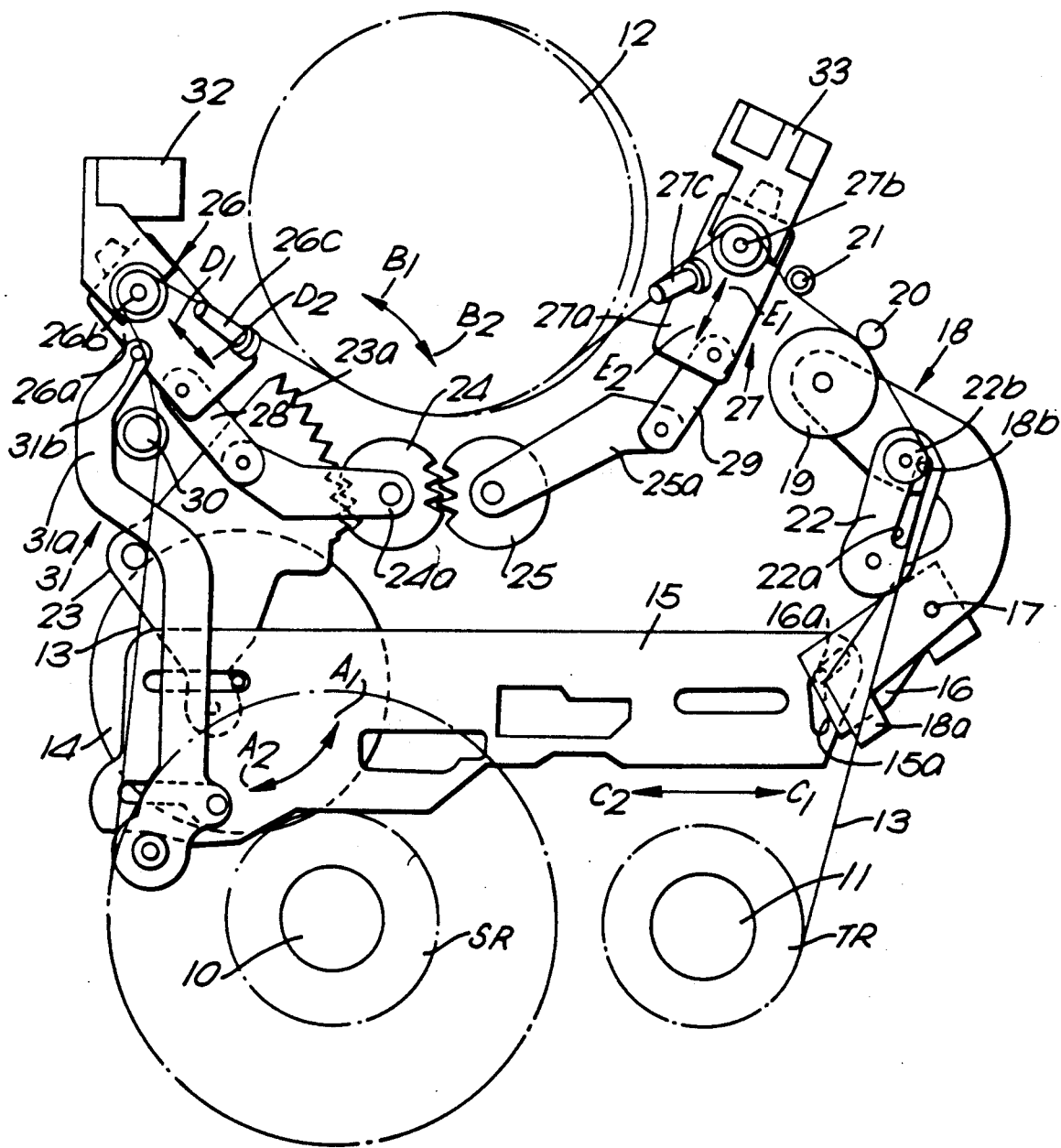
FIG. 1 is a plan view for explaining one embodiment of the tape according to the present invention.

The present invention will be described in detail with reference to the FIGURES 1, 2 and 3. Throughout the drawings, like or equivalent reference numerals or letters will be used to designate like or equivalent elements for simplicity of explanation.

Referring now to FIG. 1, a first embodiment of the tape loading apparatus for cassette tape players according to the present invention will be described in detail. FIG. 1 is a plan view showing the tape loading apparatus applied to a DAT player.

In FIG. 1, first and second reel bases 10 and 11 are rotatably mounted on a chassis (not shown). The first and second reel bases 10 and 11 are provided for rotating a supply reel SR and a take-up reel TR of a DAT cassette, when the DAT cassette is loaded in the DAT player by a cassette loading mechanism (not shown). Thus, the supply reel SR and the take-up reel TR are rotated by a conventional reel drive mechanism (not shown) provided on the chassis through the first and second reel bases 10 and 11 A rotary head drum 12, which has a rotary head (not shown) for recording and/or reproducing data to/from a tape 13, is provided on the chassis at a position separated by a prescribed distance from the first and second reel bases 10 and 11.

The tape loading apparatus further comprises a control cam 14, like a conventional DAT player. The control cam 14 is provided betWeen the first reel base 10 and the rotary head dram 12. The control cam 14 is mounted on the chassis so that the control cam 14 can rotate in the directions as shown by arrows A1 and A2 in the drawing. The control cam 14 is driven by a motor (not shown), when the DAT cassette is loaded in the DAT player. Thus, the control cam 14 controls a tape loading mechanism, as described in detail later.

The control cam 14 has several pieces of cam grooves and/or cam pins (not shown), as usual. The cam grooves and/or the cam pins are provided for controlling the reel drive mechanism, the cassette loading mechanism, a tape loading mechanism, etc The control cam 14 is engaged with a cam follower slider 15. The cam follower slider 15 is movably mounted on the chassis Thus, the cam follower slider 15 is driven by the rotation of the control cam 14 in the directions as shown by arrows C1 and C2 in the drawing.

The cam follower slider 15 has a control slit 15a. The control slit 15a is engaged with a control pin 16a provided on a pinch roller bias buffer plate 16. The pinch roller bias buffer plate 16 is rotatably mounted on the chassis by a support pin 17.

The pinch roller bias buffer plate 16 is engaged with a pinch roller support lever 18 through an engaging portion 18a of the pinch roller support lever 18. The engaging lever 18. The pinch roller support lever 18 is rotatably mounted on the chassis by the support pin 17 together with the pinch roller bias buffer plate 16. A bias spring (not shown) is suspended between the pinch roller bias buffer plate 16 and the pinch roller supporting lever 18. Thus, the pinch roller bias buffer plate 16 is biased to engage with the engaging portion 18a of the pinch roller support lever 18.

A pinch roller 19 is rotatably mounted on another end of the pinch roller support lever 18. The pinch roller 19 is engaged with a capstan 20 when the pinch roller support lever 18 turns in the clockwise direction in the drawing. Thus, the tape is pressed against the capstan 20. The capstan 20 is rotatably mounted on the chassis between the second reel base 11 and the rotary head drum 12. So that, the capstan controls the running of the tape 13 to the prescribed speed. A guide post 21 is provided on the chassis between the capstan 20 and the rotary head drum 12.

Further, the pinch roller support lever 18 has a guide pin 18b. The guide pin 18b is engaged with a guide roller support plate 22 through a guide slit 22a of the guide roller support plate 22 One end of the guide roller support plate 22 is rotatably mounted on the chassis. A tape guide roller 22b is rotatably mounted on another end of the guide roller support plate 22. The tape guide roller 22b also guides the tape 13.

A prescribed cam groove of the control cam 14 is also engaged with a tape loading drive lever 23 through a cam follower pin (not shown) mounted on the tape loading drive lever 23. The tape loading drive lever 23 is rotatably mounted on the chassis between the first reel base 10 and the rotary head drum 12. The tape loading drive lever 23 turns in the directions as shown by arrows B1 and B2 in the drawing when the control cam 14 rotates. The tape loading drive lever 23 is provided with a gear section 23a. The gear section 23a is meshed with a first tape loading drive gear 24. The first tape loading drive gear 24 is rotatably mounted on the chassis. The first tape loading drive gear 24 is meshed with a second tape loading drive gear 25 which is also rotatably mounted on the chassis. Thus, the first and second tape loading drive gears 24 and 25 rotate in the opposite directions, when the tape loading drive lever 23 turns.

The first and second tape loading drive gears 24 and 25 hold first and second tape loading drive arms 24a and 25a, respectively. Each one end of the first and second tape loading drive arms 24a and 25a are fixedly coupled to the first and second tape loading drive gears 24 and 25. Other ends of the tape loading drive arms 24a and 25b are coupled to first and second tape pulling sliders 26 and 27, through first and second links 28 and 29. Thus, the first and second tape pulling sliders 26 and 27 slide in the directions as shown by arrows D1 and D2 or E1 and E2 in the drawing when the tape loading drive lever 23 turns. The first and second tape pulling sliders 26 and 27 are provided on opposite positions in relation to the rotary head drum 12.

The first tape pulling slider 26 comprises a base plate 26a. a tape guide roller 26b and a tape guide pin 26c. The base plate 26a is slidably mounted on the chassis so as to move in the directions D1 and D2 by a linear guide (not shown) provided on the chassis. The second tape pulling slider 27 comprises a base plate 27a, a tape guide roller 27b and a tape guide pin 27c. The base plate 27a is slidably mounted on the chassis so as to move in the directions E1 and E2 by another linear guide (not shown) provided on the chassis. Thus, the first and second tape pulling sliders 26 and 27 pull the tape 13 in the directions D1 and El, when the tape loading mechanism is activated to load the tape 13 on the rotary head drum 12.

In the above construction, the tape loading mechanism is driven by a motor (not shown) coupled to the control cam 14. A tape loading mechanism corresponding to the first tape pulling slider 26 comprises the motor, the control cam 14, the tape loading drive lever 23, the first tape loading drive gear 24, the first tape loading drive arm 24a, the first link 28 and the first tape pulling slider 26. Another tape loading mechanism corresponding to the second tape pulling slider 27 comprises the motor, the control cam 14, the tape loading drive lever 23, the second tape loading drive gear 25, the second tape loading drive arm 25a, the second link 29 and the second tape pulling slider 27.

A guide post 30 is provided on the chassis between the first reel base 10 and the first tape pulling slider 26. The tape 13 engages with the guide post 30 when the tape loading operation is completed. A tape tension detector 31 is provided on the chassis at a position near the guide post 30. The tape tension detector 31 comprises a rocking arm 31a and a detection pin 31b. One end of the rocking arm 31a is rockably mounted on the chassis at a position near control cam 14 and the detection pin 31b is provided on another end of the rocking arm 31a. The other end of the rocking arm 31a extends toward the first tape pulling slider 26. Thus, the detection pin 31b engages with the tape 13 when the tape loading operation has completed. The tape tension detector 31 is slightly biased in the clockwise direction in the drawing by a prescribed bias means (not shown).

First and second stoppers 32 and 33 are fixed on the chassis at positions near the first and second tape pulling sliders 26 and 27. Thus, the first and second tape pulling sliders 26 and 27 engage with the first and second stoppers 32 and 33 when the first and second tape pulling sliders 26 and 27 are driven in the directions D1 and E1, respectively. Thus, the first and second tape pulling sliders 26 and 27 are held in their prescribed positions, when the tape loading operation has completed. In this operation state, the tape 13 runs from the supply reel SR to the take-up reel TR. In the tape running between the supply reel SR and the take-up reel TR, the tape 13 engages with the tape guide post 30, the detection pin 31b, the tape guide roller 26b, the tape guide pin 26c, the rotary head drum 12, the tape guide pin 27c, the tape guide roller 27b, the tape guide post 21, the capstan 20 and the tape guide roller 22b, in the turn.

The tape loading apparatus further comprises a stabilizer for stabilizing the tape running. The stabilizer is adapted for stabilizing the first and second tape pulling sliders 26 and 27, as described below. So that, the tape running is stabilized through the stabilization of the first and second tape pulling sliders 26 and 27.

Figure 2:
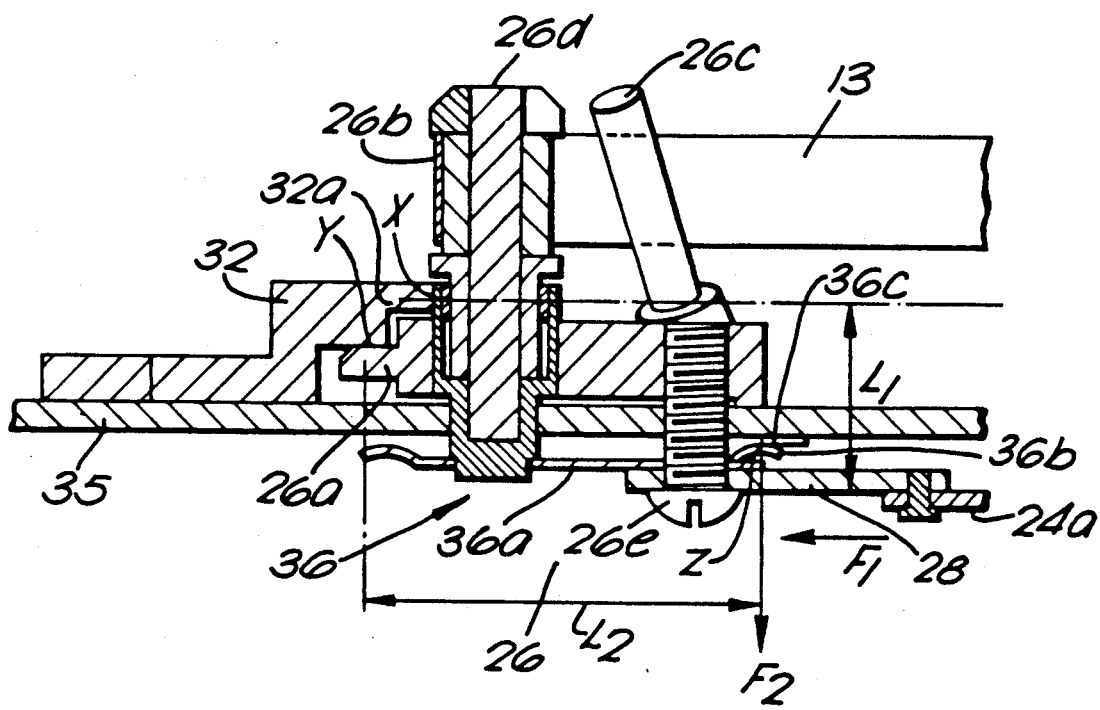
FIG. 2 is a cross-sectional view for explaining the tape pulling slider bias means.
Figure 3:
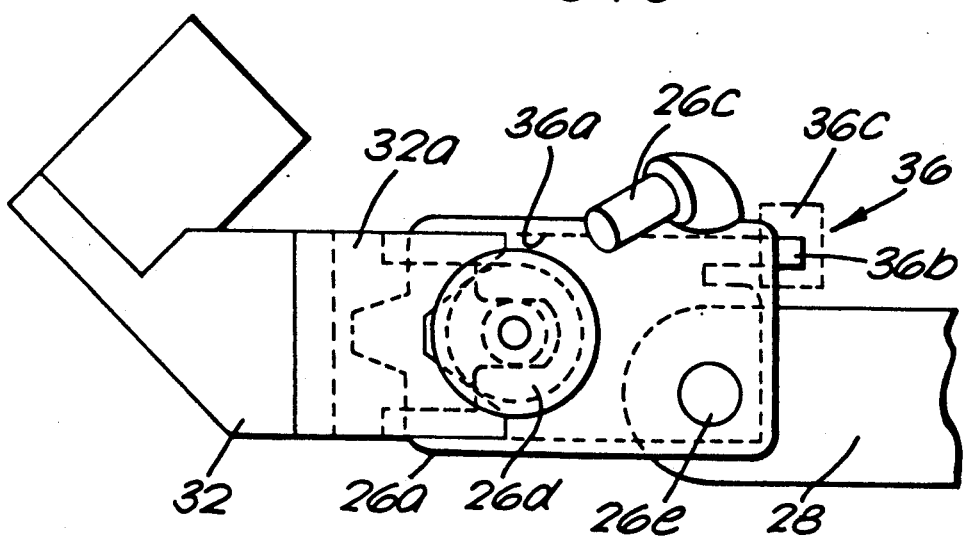
FIG. 3 is a plan view for explaining the positional relation of the tape pulling slider bias means shown in FIG. 2.

Referring now to FIGS. 2 and 3, the stabilizer will be described in detail. FIGS. 2 and 3 are a cross-sectional view and a plan view showing the stabilizer. The following description will be presented for only the stabilizer adapted for the first tape pulling slider 26, but the same stabilizer will be adapted for the second tape pulling slider 27. In FIGS. 2 and 3, elements identical to those shown in FIG. 1 are given the same references as in FIG. 1.

In FIGS. 2 and 3, the first stopper 32 is fixed on the upper side of the chassis 35 in the drawing. The first stopper 32 has two engaging portions X and Y, as shown in FIG. 2, for the first tape pulling slider 26. The first tape pulling slider 26 is slidably mounted on the upper side of the chassis 35. Thus, the base plate 26a slides on the upper side of the chassis 35. The tape guide roller 26a is rotatably mounted on base plate 26a through a roller shaft 26d. The first tape loading drive arm 24a and the first link 28 are provided under the chassis 35. The first link 28 is coupled to the base plate 26a of the first tape pulling slider 26 through a screw 26e. The screw 26e penetrates a guide slit (not shown) of the chassis 35.

The stabilizer 36 adapted for the first tape pulling slider 26 comprises a retainer plate 36a with a bias element, e.g., a leaf spring 36b and a convex 36c. The convex 36c is fixed on the lower side of the chassis 35. The retainer plate 36a is mounted on the first link 28 with a prescribed space left from the lower side of the chassis 35 by the screw 26e. The leaf spring 36b is formed in the rear portion of the retainer plate 36a. The leaf spring 36b engages with the convex 36c when the first tape pulling slider 26 has engaged with the first stopper 32.

When the first tape pulling slider 26 provided with the stabilizer 36 is engaged with the first stopper 32, the first link 28 urges the base plate 26a against the stopper 32 with a force $F_1$. The force $F_1$ acts on the engaging portion X. Thus, a first moment of force $MF_1$ ($MF_1 = F_1 \times L_1$) acts on the base plate 26a, where, $L_1$ is the distance between the first link 28 and the engaging portion X At the same time, the leaf spring 36b urges the rear end of the base plate 26a toward the chassis 35 with a force $F_2$. The reaction of the force $F_2$ acts to rock the first tape pulling slider 26 against the stopper 32 with the same force $F_2$. Thus, a second moment of force $MF_2$ ($MF_2 = F_233\ L_2$) is also applied thereto as the leaf spring 36b is compressed by the convex 36c.

Therefore, in addition to the first moment of force $MF_1$, the second moment of force $MF_2$ is also keeping to stabilize the first tape pulling slider 26.

In FIG. 3, the leaf spring 36b is provided on the retainer plate 36a at a side of one corner of the first link 28. The convex 36c is provided at a position where the convex 36c is pressed by the leaf spring 36b when the first tape pulling slider 26 is held by the stopper 32.

Now, the operation of the tape player constructed as above will be explained referring to FIGS. 1, 2 and 3.

First, a DAT cassette (not shown) is loaded in a cassette holder (also not shown) of the DAT cassette. The slide cover (not shown) of the DAT cassette is slid to expose the reel hubs of the take-up reel TR and the supply reel SR by a pawl of the cassette holder. Thus, the tape pulling sliders 26 and 27 are positioned behind the tape 13. Then, the motor (not shown) which drives the control cam 14 is turned ON. The control cam 14 turns in the direction of the arrow A1 so that the tape loading drive lever 23 turns in the direction of the arrow B1.

When the tape loading drive lever 23 is turned in the direction of the arrow B1, the loading gears 24 and 25 are also turned. Accordingly, the tape pulling sliders 26 and 27 slide to the stoppers 32 and 33 along the linear guides provided on the chassis 35, respectively. Then, the tape pulling sliders 26 and 27 are held by the stoppers 32 and 33, respectively. At this time, the base plates 26a and 27a are brought in contact with the stoppers 32 and 33, respectively, under the biases caused by the first and second moment of forces $MF_1$ and $MF_2$.

Further, simultaneously with the operations, the cam follower slider 15 slides in the direction of the arrow C2 so that the pinch roller support lever 18 advances toward the capstan 20.

As a result, as shown in FIG. 2, a part of the tape 13 which is pulled out from the supply reel SR by the first tape pulling slider 26 is brought in contact with the rotary head drum 12 via the guide post 30, the guide roller 26b and the guide pin 26c of the first tape pulling slider 26. Further, another part of the tape 13 which is pulled out from the take-up reel TR by the second tape pulling slider 27 is guided between the pinch roller 19 and the capstan 20 by the guide roller 15. Further, the tape 13 pulled toward the capstan 20 is brought in contact with the rotary head drum 12 via the guide post 21, the guide roller 27b and the guide pin 27c of the second tape pulling slider 27.

The tape 13 is driven to run from the supply reel SR to the take-up reel TR for recording or reproducing under the state. The speed of the tape running is controlled by the rotation of the capstan 20, since the tape is pressed against the capstan 20 by the pinch roller 19.

The passage of the tape 13 during the recording or reproducing operation is defined by the first and second tape pulling sliders 26 and 27, as described above. The first and second tape pulling sliders 26 and 27 are stabilized by the stabilizers, 36. Thus, the running of the tape 13 on the rotary head drum 12 is precisely stabilized. The base plates 26a and 27a of the first and second tape pulling sliders 26 and 27 are kept in contact with the stoppers 32 and 33 by the biases caused by both the first and second moment of forces $MF_1$ and $MF_2$. Therefore, it is possible to perform satisfactory recording and reproduction without tracking errors. In particular, even when the links 28 and 29 coupled to the first and second tape pulling sliders 26 and 27 are made short and the moment of forces $MF_1$ given by the links 28 and 29 are reduced by a miniaturization of the tape player, it is possible to give a sufficient pressing force.

Further, the stabilizers are not limited only to the structure described in this embodiment but any means having the same effect can be used. Further, a DAT player is described in the above embodiment, but the present invention can be applied to other tape players, e.g., video tape players.

As described above, the present invention can provide an extremely preferable tape loading apparatus for a cassette tape player.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without department form the central scope thereof. Therefore, it is intended that the present invention not be limited to the particular embodiment disclosed as the best mode contemplated for carrying out the present invention, but that the present invention include all embodiments falling without the scope of the appended claims.

What is claimed is:

1. A cassette tape player and tape loading apparatus provided with a rotary head drum mounted on a chassis, the rotary head drum including a magnetic head to reproduce or record data from or onto a tape, comprising:

a control cam rotatably mounted on the chassis;
   stoppers disposed on the chassis;
   a tape loading mechanism including first and second tape pulling slider means slidably disposed on the chassis for loading the tape onto the rotary head drum during a reproducing or recording operation;
   a tape loading drive lever rotatably mounted on the chassis in communication with the control cam, the drive lever including a gear section;
   first and second tape loading drive arms rotatably mounted on the chassis;
   gear means in communication with the gear section for selectively driving the first and second tape loading drive arms in response to the rotation of the control cam and tape loading drive lever;
   link means disposed between each of the first tape pulling slider means and the first tape loading drive arm and the second tape pulling slider means and the second tape loading drive arm for urging the tape pulling slider means against the stopper with a first force during a reproducing or recording operation; and
   biasing means operative in cooperation with the link means for applying a second force to the first and second tape pulling slider means to further retain and stabilize the tape pulling slider means against the chassis during the reproducing or recording operation.

2. The cassette tape player and tape loading apparatus of claim 1 wherein the first and second forces provided by the link means and the biasing means are perpendicular to each other.

3. The cassette tape player and tape loading apparatus of claim 1 wherein each of the first and second tape pulling slider means comprises a base plate, a tape guide roller and a tape guide pin.

4. The cassette tape player and tape loading apparatus of claim 1 wherein the biasing means comprises a stabilizer mounted on each of the link means, each of the stabilizers including a retaining plate and a leaf spring formed in a rear portion of the retaining plate for biasing and locking the first or second tape pulling slider means against the chassis.

5. A method of retaining a tape against a rotary head drum mounted on a chassis of a cassette tape player, the rotary head drum including a magnetic head, comprising the steps of:

moving the tape along the magnetic head of the rotary head drum to reproduce or record data from or onto the tape;
   rotating a control cam disposed on the chassis to rotate a tape loading drive lever which drives a pair of tape loading drive arms;
   sliding first and second tape pulling sliders along the chassis when the tape loading drive arms are driven;
   engaging the first and second tape pulling sliders against stoppers disposed on the chassis;
   applying a first force to the first and second tape pulling sliders to stabilize and bias the first and second tape pulling sliders against the tape during a reproducing or recording operation; and
   applying a second force to the first and second tape pulling sliders, different in direction from the first force, to further stabilize and retain the first and second tape pulling sliders against the chassis during the reproducing or recording operations.

* * * * *

UNITED STATES PATENT AND TRADEMARK OFFICE
CERTIFICATE OF CORRECTION

PATENT NO.  : 5,021,899
DATED       : June 04, 1991
INVENTOR(S) : Yoshihiro Kotoda It is certified that error appears in the above-identified patent and that said Letters Patent is hereby corrected as shown below:

Abstract, line 6, after "during" insert --the--.

Abstract, line 7, after "operation" insert --,--.

Signed and Sealed this

Thirtieth Day of March, 1993

*Attest:*

STEPHEN G. KUNIN

*Attesting Officer*   Acting Commissioner of Patents and Trademarks